United States Patent
Kusnezow

(10) Patent No.: US 6,529,532 B2
(45) Date of Patent: Mar. 4, 2003

(54) APPARATUS FOR FREQUENCY CONVERSION OF A LASER

(75) Inventor: Gennadij Kusnezow, Langenhagen (DE)

(73) Assignee: LPKF Laser & Electronics AG, Garbsen (DE)

(*) Notice: Subject to any disclaimer, the term of this patent is extended or adjusted under 35 U.S.C. 154(b) by 0 days.

(21) Appl. No.: 10/014,837

(22) Filed: Dec. 14, 2001

(65) Prior Publication Data

US 2002/0114361 A1 Aug. 22, 2002

Related U.S. Application Data

(63) Continuation of application No. PCT/DE01/01388, filed on Apr. 10, 2001.

(30) Foreign Application Priority Data

Apr. 14, 2000 (DE) .......................................... 100 18 874

(51) Int. Cl.[7] .................................................. H01S 3/10
(52) U.S. Cl. .......................................... 372/22; 372/101
(58) Field of Search .......................... 372/22, 107, 108, 372/98, 101

(56) References Cited

U.S. PATENT DOCUMENTS

| | | | |
|---|---|---|---|
| 4,346,314 A | | 8/1982 | Craxton |
| 5,321,718 A | * | 6/1994 | Waarts et al. .................. 372/22 |
| 5,500,865 A | | 3/1996 | Chakmakjian et al. |
| RE35,215 E | * | 4/1996 | Waarts et al. ................. 372/108 |
| 5,848,079 A | * | 12/1998 | Kortz et al. ................... 372/22 |

FOREIGN PATENT DOCUMENTS

| | | |
|---|---|---|
| DE | 19527337 | 12/1998 |
| EP | 0854380 | 7/1998 |
| JP | 11015033 | 1/1999 |
| JP | 11044897 | 2/1999 |
| WO | 00/03293 | 1/2000 |

OTHER PUBLICATIONS

D. Fluck, "Efficient second–harmonic generation by lens wave–guiding in KnbO$_3$ crystals" Optics Communication, 1998.

F. Druon, "High–repetition–rate 300–ps pulsed ultraviolet source with a passively Q–switched microchip laser and a multipass amplifier" Optics Letters, 1999.

Lexikon der Optik, H. Haferkorn, Hrsg., hanau: dausien 1988, Section 130–342.

* cited by examiner

*Primary Examiner*—Leon Scott, Jr.
(74) *Attorney, Agent, or Firm*—Crowell & Moring LLP

(57) ABSTRACT

An apparatus for frequency conversion of a laser (1) in which one or more non-linear crystals (5, 6) are arranged in the laser beam (3), and the necessary power density is produced by an arrangement of a dedicated focussing lens (4), in the region of the focal point (14), with a collimator, which minimizes the divergence of the laser beam (3), an optical corrector, which shapes the cross section of the laser beam (3). A single focussing lens (4) is provided behind which a corrective lens (7) is arranged at an angle to the optical axis and at a distance which corresponds roughly to the sum of both focal lengths such that the focussing lens (4) and the corrective lens (7) form the collimator and the corrective lens (7) also functions as a corrector. In this way a laser is produced which is characterized by small size and a simple and economical construction.

4 Claims, 1 Drawing Sheet

APPARATUS FOR FREQUENCY CONVERSION OF A LASER

CROSS REFERENCE TO RELATED APPLCATIONS

This application is a continuation of international patent application no. PCT/DE01/01388, filed Apr. 10, 2001, designating the United States of America, the entire disclosure of which is incorporated herein by reference. Priority is claimed based on Federal Republic of Germany patent application no. DE 100 18 874.5, filed Apr. 14, 2000.

BACKGROUND OF THE INVENTION

The present invention relates to a device for frequency conversion of a laser by means of one or more non-linear crystals arranged in the laser beam, into which the required power density is introduced by an arrangement in the area of the narrow point of an associated focusing lens system, with a collimator that minimizes the divergence of the laser beam, and with an optical beam converter that shapes the cross section of the laser beam.

Published international patent application no. WO 00/03293 discloses a device for the frequency conversion of the light of a laser in which a non-linear crystal is arranged in the laser beam, into which the required power density is introduced by an arrangement in the area of the narrow point of a focusing lens system, and with a collimator that minimizes the divergence of the laser beam.

U.S. Pat. No. 5,848,079 (=DE 195 27 337) further discloses the arrangement of several non-linear crystals in a device for the frequency conversion of the light of a laser, in which focusing lens systems or a polarization rotator are arranged, respectively, between the crystals. If focusing lens systems are associated with the crystals, the corresponding design requires a relatively long overall length.

In principle, it is also already known, for example from "Lexikon der Optik," H. Haferkorn, Ed., Hanau: Dausien 1988, pp. 342, to arrange a lens system as a beam converter for the spatial shaping of the beam. The arrangement of an additional lens system has the drawback that the technical complexity that is required to shape the cross section of the laser beam is high.

SUMMARY OF THE INVENTION

It is an object of the invention to provide a laser with an improved integrated optical beam converter.

Another object of the invention is to provide a laser with an integrated optical beam converter that is characterized by small overall size and simplified, cost-effective design.

These and other objects of the invention are achieved by providing an apparatus for frequency conversion of laser light comprising at least one non-linear crystal arranged in a laser beam and into which the required power density is introduced by an arrangement in the area of the focal point of an associated focusing lens system, the apparatus comprising a collimator that minimizes divergence of the laser beam and an optical beam converter that shapes the laser beam cross section, wherein the collimator is formed by a correction lens, and means are provided to change the angular position of the correction lens by an angle θ relative to the laser beam such that the correction lens additionally acts as an optical beam converter.

Further preferred embodiments of the invention are described and claimed hereinafter.

The fact that the collimator is formed by a correction lens and means are provided to change the angular position by an angle θ relative to the laser beam makes it possible for the correction lens in addition to act as an optical beam converter. Thus, it is possible to adapt the cross section of the laser beam to different requirements or to adjust the device with minimum complexity. Furthermore, a small overall length and a significant simplification of the technical design are achieved.

A preferred embodiment comprises two crystals arranged in the laser beam, one directly behind the other. Their geometric center is in or near the point of the focusing lens making it possible here again to introduce the required power density. Thus, even if two crystals are arranged, only a single focusing lens system is required. Moreover, an additional collimator is eliminated.

It is furthermore advantageous if the correction lens is a spherical lens. This makes it possible to use the astigmatism of the lens to shape the desired cross section of the laser beam even by means of small corrections in the angular position of the correction lens relative to the optical axis.

Preferably, the correction lens is supported in an inner ring, which is rotatable about an axis relative to the optical axis by an angle θ. This inner ring with its axis is preferably mounted within an outer ring that can be azimuthally rotated by an angle φ. A construction of this type makes it possible to align the correction lens exactly in the beam path at any angle relative to the optical axis to form the cross section of the laser beam.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
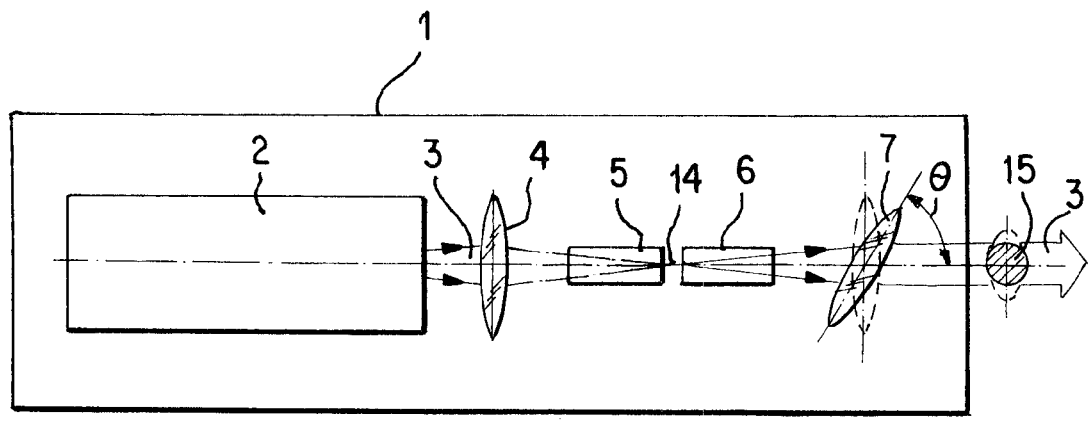
FIG. 1 is a schematic representation of an apparatus according to the invention.
Figure 2:
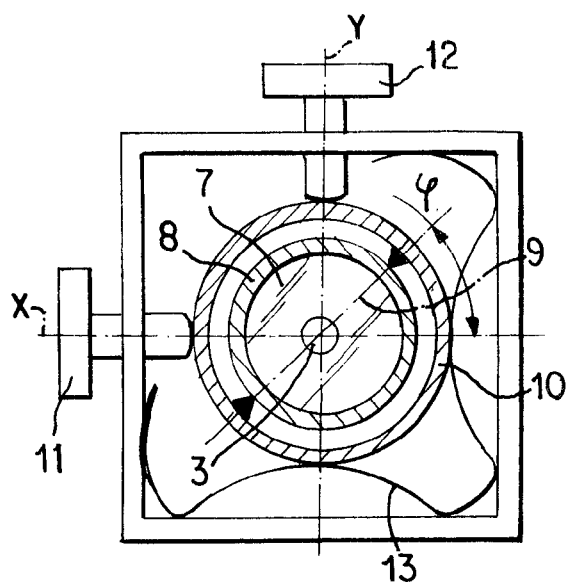
FIG. 2 shows a correction lens in its adjusting mount.
Figure 3:
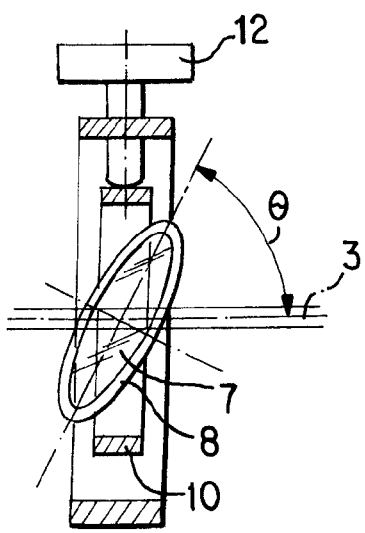
FIG. 3 is a cross sectional view through the correction lens according to FIG. 2.

In the drawing, 1 identifies a laser having an oscillator 2 with a fundamental wavelength. In a laser beam 3 of laser 1 a focusing lens system 4 is arranged, preferably a simple convex lens. Behind the focusing lens system 4, two non-linear crystals 5 and 6 are arranged one directly behind the other in the area of the narrow point 14 of the laser beam 3. The crystals 5 and 6 are cut differently relative to their crystallographic axes and have different optical characteristics.

Behind the crystals 5 and 6, a correction lens 7 is arranged. This correction lens 7 is supported in an inner ring 8 that is rotatable about an axis 9 relative to the optical axis, i.e., relative to the laser beam 3, by an angle θ. The inner ring 8 with its axis 9 is mounted in an outer ring 10. The outer ring 10 can be azimuthally rotated by an angle φ.

The oscillator 2 is, for instance, a YAG laser having a wavelength of 1.064 nm. The focusing lens system 4, which is arranged in the laser beam 3 behind the oscillator 2, focuses the laser beam 3 in such a way that the geometric center of the two crystals 5 and 6, embodied for instance as LBO crystals, is located in or near the narrow focal point 14 of the laser beam 3. In this way the necessary power density is introduced into the crystals 5 and 6, with the wavelength of the YAG laser being reduced to 532 nm in the first crystal 5. In the second crystal 6, the incident fundamental wavelength of the oscillator and the 532 nm wavelength (second harmonic) formed by the first crystal 5 is converted in such a way that the laser beam 3 exits with a triply reduced wavelength of 355 nm (third harmonic).

In this area, however, the laser beam 3 has the drawback that its cross section 15 resulting from the different optical characteristics of the two crystals 5 and 6 has a non-circular, elliptical cross section in transverse directions x and y relative to the optical axis. The correction lens 7 arranged behind crystals 5 and 6 has the additional task to correct the elliptical cross section 16 of the laser beam 3 and to give it, for instance, a round cross section. The correction lens 7 can be angularly adjusted relative to the laser beam 3 by an angle θ, thereby permitting the shape of the cross section 15 to be adjusted.

In addition, correction lens 7 in conjunction with the focusing lens system 4 acts as a collimator, i.e., the divergence of the laser beam 3 is minimized. The distance between the focusing lens system 4 and the correction lens 7 is approximately equal to the sum of the two focal lengths.

The correction lens 7 is configured as a spherical lens. This has the advantageous effect that each angular adjustment by an angle φ relative to the laser beam 3 is actually effective in terms of a change in the cross section of the laser beam 3 because the astigmatism of the correction lens 7 is being used.

For the adjustment by an angle φ relative to the optical axis, i.e., relative to laser beam 3, the correction lens 7 is supported in an inner ring 8, which is rotatable about an axis 9 relative to the optical axis. The inner ring 8 with its axis 9 is mounted in an outer ring 10. This outer ring 10 can be azimuthally rotated in the device in x and y direction by an angle φ by means of two adjusting screws 11 and 12 and a clamping spring 13. For the basic adjustment, the outer ring 10 can be adjusted in x and y directions by means of adjusting screws 11 and 12.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. An apparatus for frequency conversion of laser light comprising at least one non-linear crystal arranged in a laser beam and into which the required power density is introduced by an arrangement in the area of the narrow point of an associated focusing lens system, said apparatus comprising a collimator that minimizes divergence of the laser beam and an optical beam converter that shapes the laser beam cross section, wherein the collimator is formed by a correction lens, and means are provided to change the angular position of the correction lens by an angle θ relative to the laser beam such that the correction lens additionally acts as an optical beam converter.

2. An apparatus according to claim 1, wherein two crystals are arranged one directly after the other in the laser beam.

3. An apparatus according to claim 1, wherein the correction lens is configured as a spherical lens.

4. An apparatus according to claim 1, wherein the correction lens is supported in an inner ring which is rotatable about an axis relative to the laser beam by an angle θ, and said inner ring with its axis is mounted in an outer ring that can be azimuthally rotated by an angle φ.

* * * * *